United States Patent [19]

Nickoloff

[11] Patent Number: 4,538,654
[45] Date of Patent: Sep. 3, 1985

[54] MULTIPLE USE FIXTURE ASSEMBLIES FOR A CUTTING TOOL

[76] Inventor: Alex M. Nickoloff, 5383 E. Atherton Rd., Burton, Mich. 48519

[21] Appl. No.: 628,502

[22] Filed: Jul. 6, 1984

[51] Int. Cl.³ ............................................. B27C 9/00
[52] U.S. Cl. .................................. 144/1 F; 29/27 A; 29/28; 51/108 BS; 51/216 ND; 51/225; 76/37; 76/79; 144/134 D
[58] Field of Search .................. 76/37, 78 R, 79; 51/108 BS, 216 ND, 225; 409/144; 408/20, 21; 144/1 R, 1 E, 1 F, 134 D, 136 C; 29/560, 27 A, 28, 57

[56] References Cited

U.S. PATENT DOCUMENTS

| 2,672,898 | 3/1954 | Schuster | 144/136 C |
| 2,797,716 | 7/1957 | Hatcher | 144/1 R |
| 2,805,691 | 9/1957 | Medal | 408/20 |
| 2,888,965 | 6/1959 | Phillips | 144/1 R |
| 2,933,021 | 4/1960 | Kennedy et al. | 144/136 C |
| 3,952,616 | 4/1976 | Varley | 51/216 ND |
| 4,312,391 | 1/1982 | Snow | 144/1 F |

Primary Examiner—W. D. Bray
Attorney, Agent, or Firm—James M. Deimen

[57] ABSTRACT

Combinations of fixture assembly parts assembleable to provide fixtures to support and convert a small high speed electric grinder such as a "Dremel" brand tool into a lathe, a router, a circular saw blade sharpener or a shaper. All of the fixture parts are formed of simple sheet metal shapes and common screw machine hardware fittings such as bolts, nuts, washers and threaded rods. The sheet metal shapes are formed with simple holes and slots thus the parts for the fixture assemblies are very inexpensive to manufacture. The parts are also very simple to assemble and disassemble into the various configurations.

17 Claims, 8 Drawing Figures

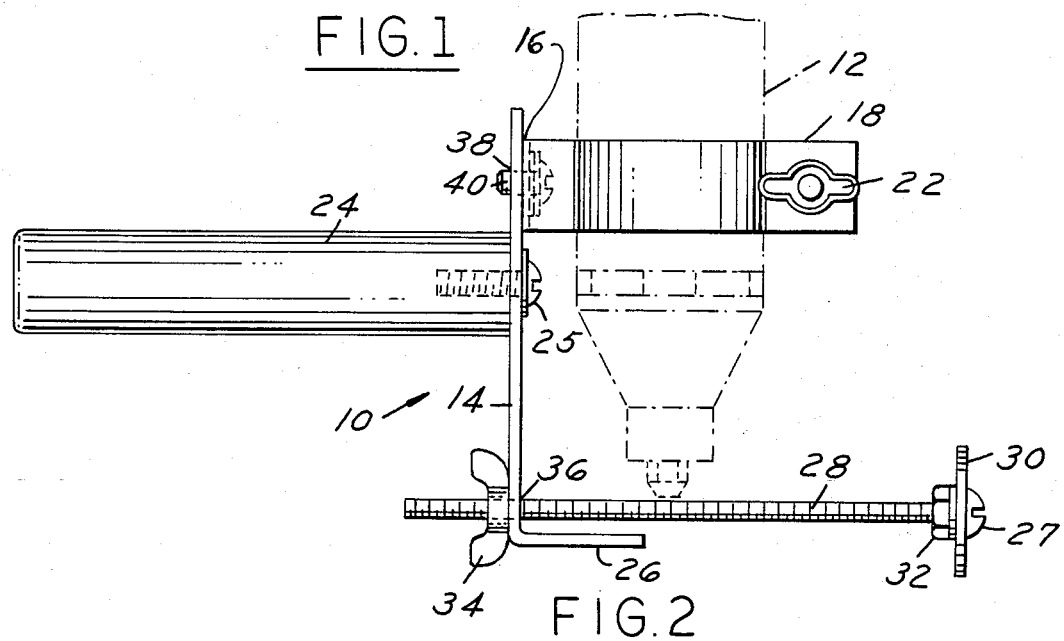
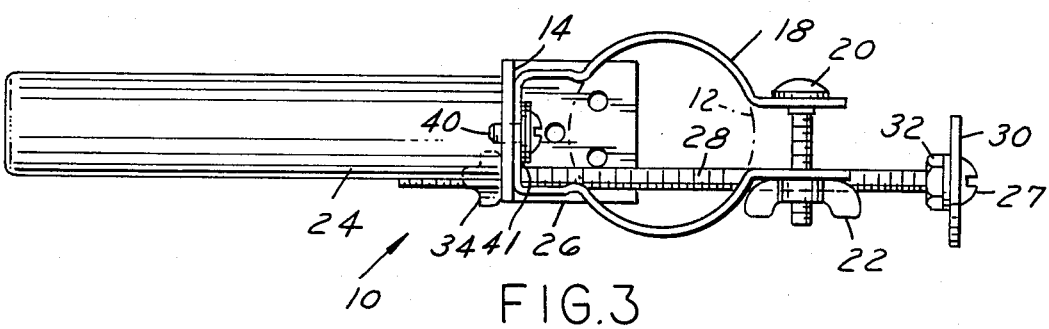
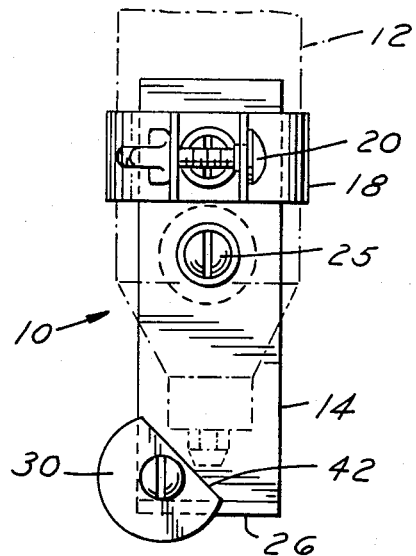

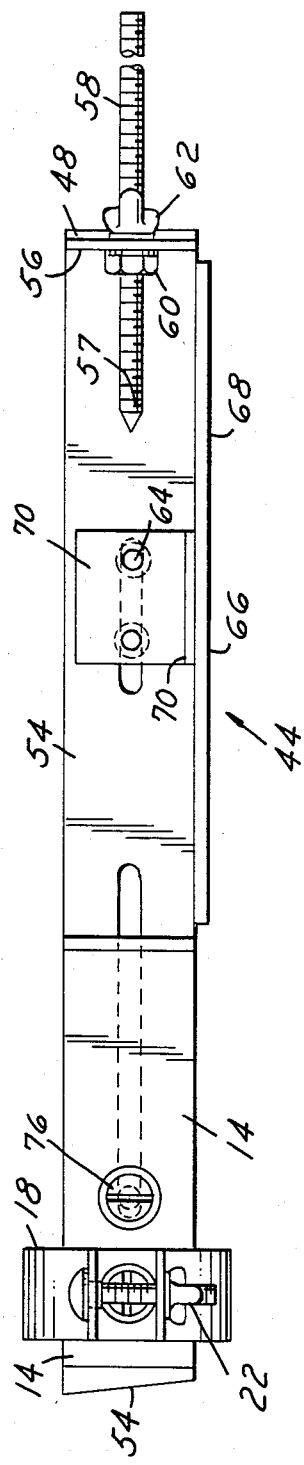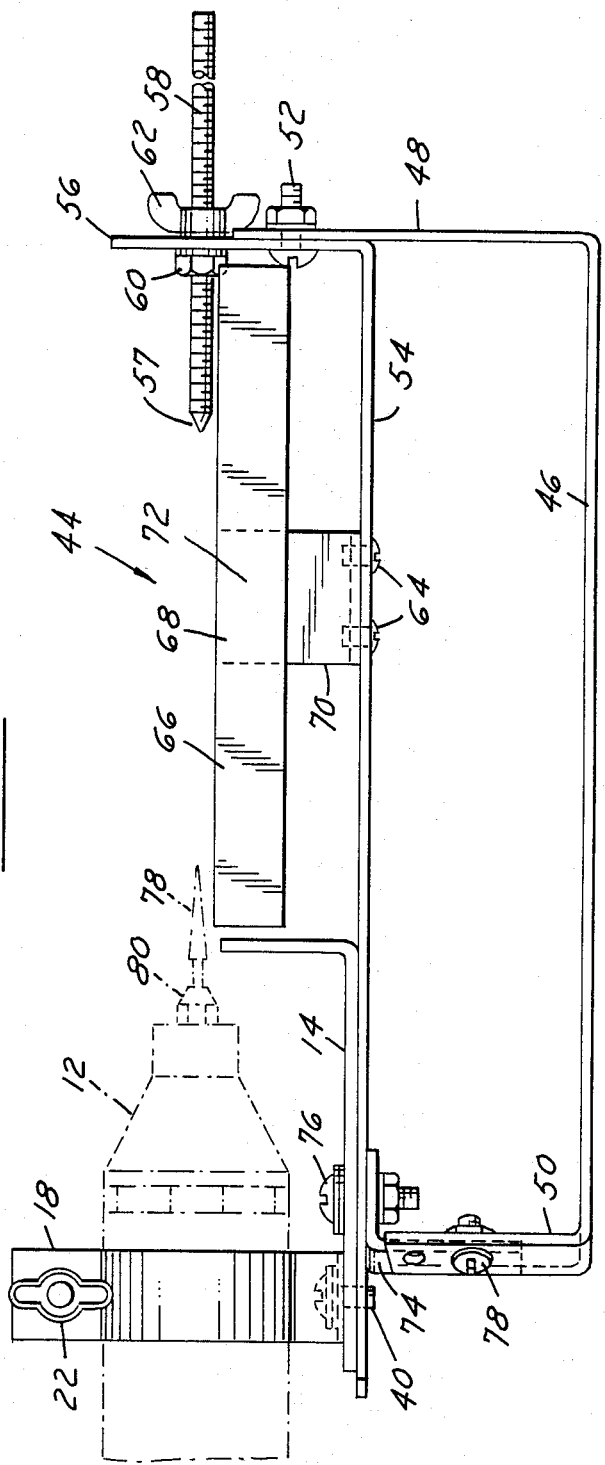

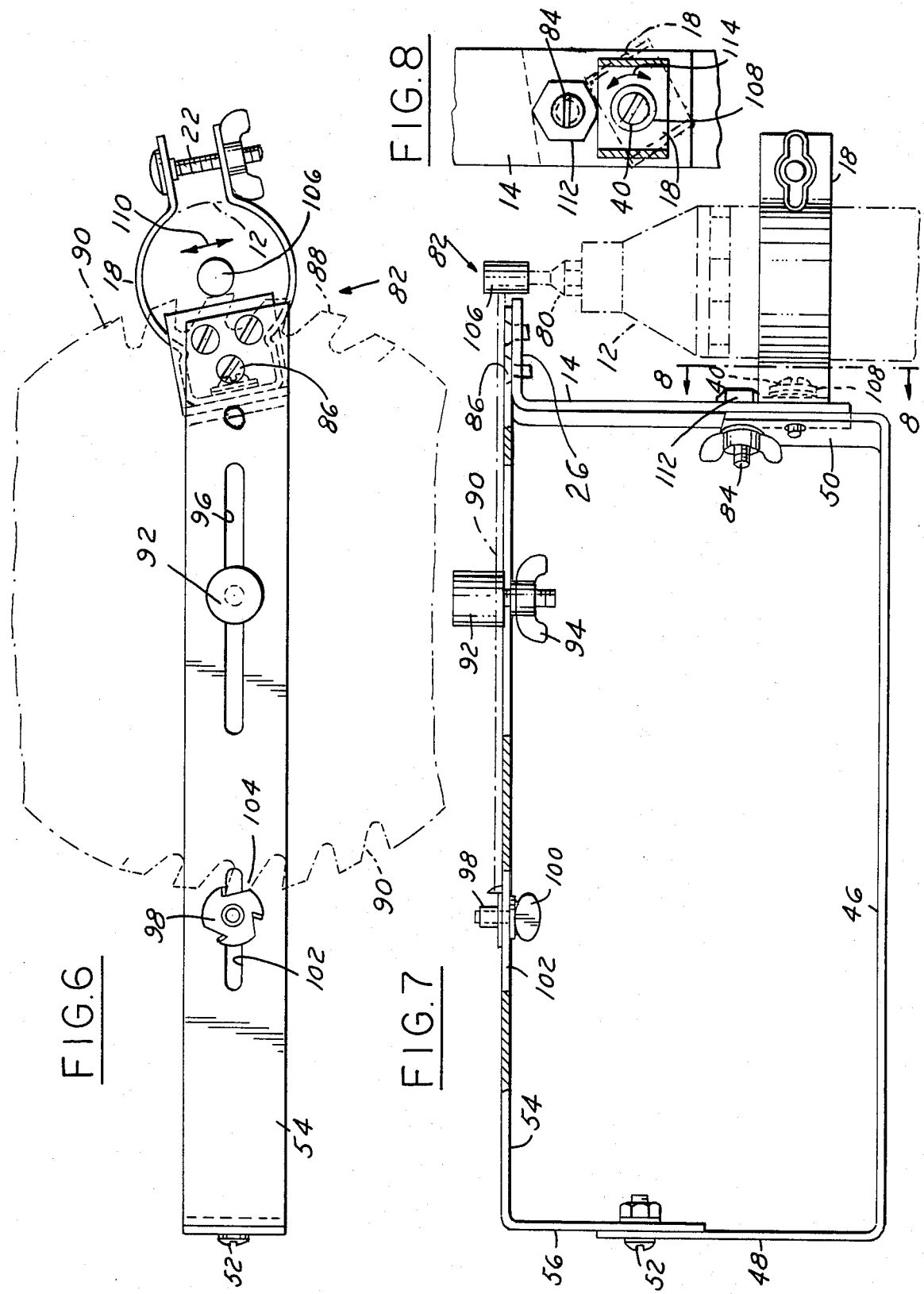

MULTIPLE USE FIXTURE ASSEMBLIES FOR A CUTTING TOOL

BACKGROUND OF THE INVENTION

The field of the invention pertains to fixtures that can be adjusted or reassembled to provide more than one cutting function for motor driven cutting tools. In particular, the fixtures may include the motor drive unit for a variety of cutting functions as an integral part of the fixture assembly. The "Shopsmith" brand mutiple use tool exemplifies such a tool wherein the framework adjusts to a variety of positions and the cutting heads may be interchangeably attached to the motor driven unit.

The motor drive unit may, alternatively, be a separate entity from the fixture such as a common electric hand drill or a "Dremel" brand high speed electric grinder. Although the large multiple use machines tend to provide integral motor drive units and the small multiple use machines to use common small drills or grinders there are exceptions such as the "Unimat" brand combination metal lathe and vertical mill.

U.S. Pat. No. 2,768,663 and U.S. Pat. No. 2,888,965 both disclose multiple use fixtures for a common portable electric hand drill. The most common fixture adaptations are to a lathe and a drill press with other options including a grinder, router and plane. U.S. Pat. No. 2,255,541 discloses fixtures to convert a "Dremel" brand grinder into a shaper and a router and U.S. Pat. No. 2,672,898 illustrates a fixture for edge dressing and profiling with a small electric grinder.

U.S. Pat. No. 3,288,183 and U.S. Pat. No. 3,179,136 disclose fixtures to convert portable electric hand drills to portable routers and other uses. Similarly U.S. Pat. No. 4,057,358 and U.S. Pat. No. 4,235,565 disclose fixtures to precisely locate a portable electric drill for accurately locating dowel joints. U.S. Pat. No. 2,822,836 discloses the conversion of a portable electric drill into a table saw or portable hand saw. The common factor among all of the disclosures is the requirement for several very specialized and expensive parts in each of the fixture assemblies. Such expensive parts, in particular, special machined castings, substantially increase the cost to manufacture the fixtures and thereby limit their use. With a view toward drastically decreasing and substantially eliminating the number of specialized parts in a multiple use fixture assembly for a cutting tool and also providing a different combination of uses, applicant has invented the fixture assembly combination disclosed below.

SUMMARY OF THE INVENTION

The invention comprises multiple use fixture assemblies that convert a small high speed electric grinder such as a "Dremel" brand grinder into a lathe, a router, a shaper or a circular saw blade sharpener. All of the fixture parts are formed of simple sheet metal shapes and common screw machine hardware fittings such as bolts, nuts, washers and threaded rods. No machined castings are required, rather, the sheet metal parts are formed with holes and slots and the hardware fittings are used in novel ways to accomplish the same results as specialized expensive parts. The fixture parts are very simple to assemble and disassemble into the various fixtures to create the tools above.

DESCRIPTION OF THE DRAWINGS

FIG. 1 is a side view of a first fixture assembly to convert a small grinder to a hand held router;

FIG. 2 is a top view of the fixture assembly of FIG. 1;

FIG. 3 is an end view of the fixture assembly of FIG. 1;

FIG. 4 is a top view of a second fixture assembly to convert a small grinder to a lathe;

FIG. 5 is a side view of the fixture assembly of FIG. 4;

FIG. 6 is a top view of a third fixture assembly to convert a small grinder to a circular saw blade sharpener;

FIG. 7 is a side view of the fixture assembly of FIG. 6; and,

FIG. 8 is a cutaway detail of the saw blade sharpener taken in the direction of arrows 8 in FIG. 7.

DESCRIPTION OF THE PREFERRED EMBODIMENTS

Illustrated in FIGS. 1, 2 and 3 is a combination of fixture parts generally denoted by 10 assembled to support vertically a small electric grinder shown ghosted at 12. A "Dremel" brand electric high speed grinder is a suitable small grinder. An L-shaped sheet metal motor support bracket 14 has attached at 16 a sheet metal clamp 18 with a bolt and wing nut 20 and 22 for tight retention of the grinder 12 therein. Below the clamp 18 and attached by a screw 25 on the opposite side of the bracket 14 is a large handle 24 formed from a wooden dowel.

Below the handle 24 and just above the base 26 of the bracket 14 is an optional guide 27 comprising a long bolt 28 having a large washer 30 and nut 32 at the head end to form the guide means. The holes at 36 and 38 in the bracket 14 are threaded to retain the bolt fasteners 28 and 40 respectively with the wing nut 34 performing a locking function. A lock washer 41 is located under bolt 40. The guide washer 30 has a portion at 42 flatted or cutaway to permit the washer 30 to be adjusted close to the grinder 12. Most of the parts used for the router fixture above are used in the lathe and saw sharpener combinations disclosed below.

Illustrated in FIGS. 4 and 5 is a lathe generally denoted by 44. The lathe frame comprises a U-shaped sheet metal frame 46 having one leg 48 longer than the other leg 50. The leg 50 is also biased or twisted toward the viewer as shown, the purpose of which will be explained with the explanation of the saw sharpener.

Attached by a bolt and nut 52 to the leg 48 is a long L-shaped frame 54, the short leg 56 of which extends above leg 48 to support a lathe tail stock 57. The bracket 14, U-shaped frame 46 and L-shaped frame 54 may suitably be constructed from $\frac{1}{8}"$ by $1\frac{1}{2}"$ 0 mild steel bar stock or sheet steel. The tail stock 57 comprises a threaded and pointed rod 58 with a nut 60 and wing nut 62 to secure and adjust the tail stock. Attached by small screws 64 to the long L-shaped frame 54 is a tool support 66 comprising a bar 68 and bracket 70 spot welded together at 72. The tool support 66 may be constructed of flat bar stock as shown or bar stock of about $\frac{1}{4}"$ by $\frac{1}{4}"$ in cross section for the bar 68.

Also attached to the longer leg of the L-shaped frame 54 is the motor support bracket 14 and a bracket 74 with a bolt and nut 76. The bracket 74 is also attached by a bolt and nut 78 to the short leg 50 of U-shaped frame 46.

As with the router, the sheet metal clamp 18 retains the grinder 12 to the motor support bracket 14, however, in position to retain a head stock 78 in the collet 80.

Illustrated in FIGS. 6 and 7 is a circular saw blade sharpener generally denoted by 82. The U-shaped frame 46 and L-shaped frame 54 are attached together with a bolt and nut 52. The motor support bracket 14 is attached by a wing nut and bolt at 84 to the short leg 50 of the U-shaped frame 46 and to the L-shaped frame 54 by three screws 86 engaging tapped holes in the base 26 of the bracket 14. The twist or bias of the leg 50 sets the bracket 14 at the angle (usually 12°) required to sharpen the peripheral edge 88 of a saw blade 90 mounted atop the L-shaped frame 54.

The saw blade 90 is located by a central bushing 92 affixed by wing nut 94 to the L-shaped frame 54 through the slot 96. A standard T-nut 98 affixed by a thumb screw 100 through slot 102 engages a tooth 104 on the opposite side of the blade 90. Merely by lifting the blade 90 slightly the T-nut 98 can be disngaged and the blade rotated tooth by tooth to position each tooth at the location of the grinding wheel 106.

During the grinding operation the blade is not moved and the tooth being ground is fixed in position. In this, the saw sharpener embodiment of the fixture assemblies, the clamp 18 is not tightly affixed to the motor support bracket 14 but rather a plurality of washers 108 are fastened under the head of the bolt 40 to allow the grinder 12 and clamp 18 to swivel on the bracket 14. This swivelling permits the grinding wheel to move past and grind the entire tip of the tooth 88 as indicated by the double arrow 110.

The bolt 40 is retained in the bracket 14 by the threaded hole 38 therein as indicated in FIG. 1 and by means to limit the swivelling of the clamp 18 as shown in FIG. 8. In FIG. 8 the bolt and wing nut 84 retain a hexagonal nut 112 which is engageable by the clamp 18 base adjacent thereto to limit the swivelling of the clamp 18 about the bolt 40 as indicated by double arrow 114. Thus, the nut 112 limits the travel of the grinding wheel 106 to the tip of a single tooth on the blade 90.

Alternatively, the clamp 18 can be tightly affixed to the bracket 14 as in the router and lathe embodiments with the grinding wheel 106 axis vertical. A flat plate about 2½" by 6" to form a table of somewhat larger size can be affixed to the top of L-shaped frame 54 by the flat head countersunk screws 86 in substitution for the saw blade. This combination creates a fixture for a small table shaper. The flat plate can also be affixed directly to the base 26 of the bracket 14 in the router fixture to provide a larger router bearing area.

In the lathe, saw sharpener and shaper embodiments the U-shaped frame member 46 should be clamped to a table top or other large mass for stability and safety.

I claim:

1. Multiple interchangeable part fixture assemblies to support a powered cutting tool in at least one of three or more selectable different cutting configurations, comprising, two elongated substantially L-shaped frame members and a U-shaped frame member, said L and U-shaped members selectably attachable together to form a frame for at least one cutting configuration, one of said L-shaped members separately usable as a frame for another cutting configuration, clamp means attachable to at least one of the frame members to retain a powered cutting tool, and, selectable locating means attachable to at least one of said frame members for locating a work piece relative to the powered cutting tool, said locating means selectable from a set substantially of standard hardware fittings.

2. The multiple interchangeable part fixture assemblies as claimed in claim 1 wherein three of said cutting configurations comprise a hand router, a lathe and a saw sharpener, said router having the L-shaped frame and the lathe and saw sharpener having substantially rectangular shaped frames formed by assembling the U-shaped and L-shaped members in differing configurations.

3. The multiple interchangeable part fixture assemblies as claimed in claim 1 wherein the separately usable L-shaped frame comprises a router frame having the clamp and the locating means extending from the same leg of the L-shape, and including a handle extending from the same leg of the L-shape but in the opposite direction.

4. The multiple interchangeable part fixture assemblies as claimd in claim 3 including a table plate attached to the other leg of the router frame to form an extended router base.

5. The multiple interchangeable part fixture assemblies as claimed in claim 1 wherein said L and U-shaped members are attached together to form a lathe frame having the base comprising the U-shaped member, one of the L-shaped members extending between and above at least one of the legs of the U-shaped member, the other L-shaped member attached atop the first L-shaped member and having said clamp means attached thereto, and said locating means comprising a tail stock extending from the shorter leg of the first L-shaped member.

6. The multiple interchangeable part fixture assemblies as claimed in claim 1 wherein said L and U-shaped members are attached together to form a saw sharpener frame having the base comprising the U-shaped member, one of the L-shaped members extending between and above at least one of the legs of the U-shaped member, the other L-shaped member being attached between the first L-shaped member and one of the legs of the U-shaped member and having said clamp means attached thereto, and said locating means comprising means to engage the center and at least one tooth of a circular saw blade.

7. The multiple interchangeable part fixture assemblies as claimed in claim 5 wherein the attachment of the clamp means to the other L-shaped member permits limited swivelling movement of the clamp means.

8. The multiple interchangeable part fixture assemblies as claimed in claim 5 wherein the means to engage the center of the saw blade comprise a bushing and the means to engage a saw tooth comprise a T-nut.

9. The multiple interchangeable part fixture assemblies as claimed in claim 5 including a table plate attached to the first L-shaped member above the other L-shaped member to form a shaper base.

10. A set of interconnectable frame members and substantially standard hardware fittings wherein subsets of said frame members and fittings are selectably combineable to support a powdered cutting tool in at least one of three or more different cutting configurations, comprising, two elongated substantially L-shaped frame members and a U-shaped frame member, said L and U- shaped members selectably attachable together to form a frame for at least one cutting configuration, one of said L-shaped members separately useable as a frame for another cutting configuration, clamp means attachable to at least one of the frame members to retain a powdered cutting tool, and, selectable locating means attachable to at least one of said frame members for locating a work piece relative to the powered cutting tool, said locating means selectable from the set of hardware fittings.

11. The set of frame members and hardware fittings of claim 10 wherein the separately useable L-shaped frame comprises a router frame with the clamp and locating means assembleable to extend from the same leg of the L-shaped member, and the set including a handle attachable to extend from the same leg of the L-shaped member but in the opposite direction.

12. The set of frame members and hardware fittings of claim 11 including a table plate attachable to the other leg of the router frame to form an extended router base.

13. The set of frame members and hardware fittings of claim 10 wherein said L and U-shaped members are attachable together to form a lathe frame having the base comprising the U-shaped member, one of the L-shaped members extending between and above at least one of the legs of the U-shaped member, the other L-shaped member attached atop the first L-shaped member and having said clamp means attached thereto, and said locating means comprising a tail stock extending from the shorter leg of the first L-shaped member.

14. The set of frame members and hardware fittings of claim 10 wherein said L and U-shaped members are attachable together to form a saw sharpener frame having the base comprising the U-shaped member, one of the L-shaped members extending between and above at least one of the legs of the U-shaped member, the other L-shaped member being attached between the first L-shaped member and one of the legs of the U-shaped member and having said clamp means attached thereto, and said locating means comprising means to engage the center and at least one tooth of a circular saw blade.

15. The set of frame members and hardware fittings of claim 14 wherein the clamp means are swivelably attachable to the other L-shaped frame member and the hardware fittings include stop means to limit the swivelling movement of the clamp means.

16. The set of frame members and hardware fittings of claim 14 wherein the means to engage the center of the saw blade comprise a bushing attachable to the first L-shaped member and the means to engage a saw tooth comprise a T-nut attachable to the first L-shaped member.

17. The set of frame members and hardware fittings of claim 14 including a table plate attachable to the first L-shaped member above the other L-shaped member to form a shaper base.

* * * * *